US010598436B2

(12) United States Patent
Ferguson et al.

(10) Patent No.: US 10,598,436 B2
(45) Date of Patent: Mar. 24, 2020

(54) COOLING SYSTEM FOR A SURFACE OF A METALLURGICAL FURNACE

(71) Applicant: SYSTEMS SPRAY-COOLED, INC., Smyrna, TN (US)

(72) Inventors: Scott A. Ferguson, Murfreesboro, TN (US); Marina K. Temkina, Nashville, TN (US); Troy D. Ward, Franklin, TN (US)

(73) Assignee: Systems Spray-Cooled, Inc., Smyrna, TN (US)

( * ) Notice: Subject to any disclaimer, the term of this patent is extended or adjusted under 35 U.S.C. 154(b) by 365 days.

(21) Appl. No.: 15/490,472

(22) Filed: Apr. 18, 2017

(65) Prior Publication Data

US 2018/0299201 A1    Oct. 18, 2018

(51) Int. Cl.

| F27D 1/12 | (2006.01) |
|---|---|
| F27D 1/02 | (2006.01) |
| F27B 14/06 | (2006.01) |
| F27D 11/08 | (2006.01) |
| F27B 9/24 | (2006.01) |
| F27D 9/00 | (2006.01) |
| F27D 1/00 | (2006.01) |
| F27B 14/08 | (2006.01) |

(52) U.S. Cl.
CPC ................ F27D 1/12 (2013.01); F27B 9/24 (2013.01); F27B 14/06 (2013.01); F27D 9/00 (2013.01); F27D 11/08 (2013.01); *F27B 2014/0837* (2013.01); *F27D 2009/0016* (2013.01)

(58) Field of Classification Search
CPC ... F27D 1/025; F27D 1/12; F27D 1/16; F27D 1/1816; F27D 11/08; F27D 9/00; F27D 2009/0016; F27D 2009/0051; F27D 2009/0064; F27B 14/06; F27B 14/12; F27B 9/24; F27B 2014/0837
USPC ...... 373/71–76; 266/46, 140, 158, 159, 190, 266/193, 194, 197, 240, 241
See application file for complete search history.

(56) References Cited

U.S. PATENT DOCUMENTS

| 4,715,042 A | 12/1987 | Heggart et al. |
|---|---|---|
| 4,813,055 A | 3/1989 | Heggart et al. |
| 4,815,096 A | 3/1989 | Burwell |
| 4,849,987 A | 7/1989 | Miner, Jr. et al. |
| 5,115,184 A | 5/1992 | Arthur et al. |

(Continued)

FOREIGN PATENT DOCUMENTS

JP    3162619 B2    5/2001

OTHER PUBLICATIONS

International Search Report and Written Opinion for PCT/US2018/028203 dated Jul. 25, 2018.

*Primary Examiner* — Hung D Nguyen
(74) *Attorney, Agent, or Firm* — Patterson + Sheridan, LLP

(57) ABSTRACT

A cooling system to cool a surface of a tilting metallurgical furnace including an inner plate of the surface, a plurality of nozzles, and a drain manifold is disclosed. The inner plate has an external surface and an internal surface. The plurality of nozzles is configured to be fluidly connected to a coolant supply pipe. At least a first nozzle of the plurality of spray conduits is configured to spray coolant against the external surface of the inner plate. The drain manifold positioned to receive coolant from the external surface of the inner plate. At least a second nozzle of the plurality of nozzles is configured to spray coolant directly into the drain manifold.

20 Claims, 11 Drawing Sheets

(56) References Cited

U.S. PATENT DOCUMENTS

| | | | |
|---|---|---|---|
| 5,290,016 | A | 3/1994 | Elsner |
| 5,327,453 | A | 7/1994 | Arthur et al. |
| 5,330,161 | A | 7/1994 | Lehr et al. |
| 5,444,734 | A | 8/1995 | Arthur et al. |
| 5,548,612 | A * | 8/1996 | Matsuo ................. F27D 1/1816 373/73 |
| 5,561,685 | A | 10/1996 | Lehr et al. |
| 5,648,981 | A | 7/1997 | Miner, Jr. et al. |
| 5,887,017 | A | 3/1999 | Arthur et al. |
| 5,999,558 | A | 12/1999 | Miner, Jr. et al. |
| 6,092,742 | A | 7/2000 | Miner, Jr. et al. |
| 6,185,242 | B1 | 2/2001 | Arthur et al. |
| 6,870,873 | B2 | 3/2005 | Lyons et al. |
| 7,452,499 | B2 | 11/2008 | Arthur et al. |
| 7,625,517 | B2 | 12/2009 | Arthur et al. |
| 2008/0128962 | A1 | 6/2008 | Arthur et al. |
| 2014/0029643 | A1 * | 1/2014 | Lee ........................ F27B 3/085 373/73 |

\* cited by examiner

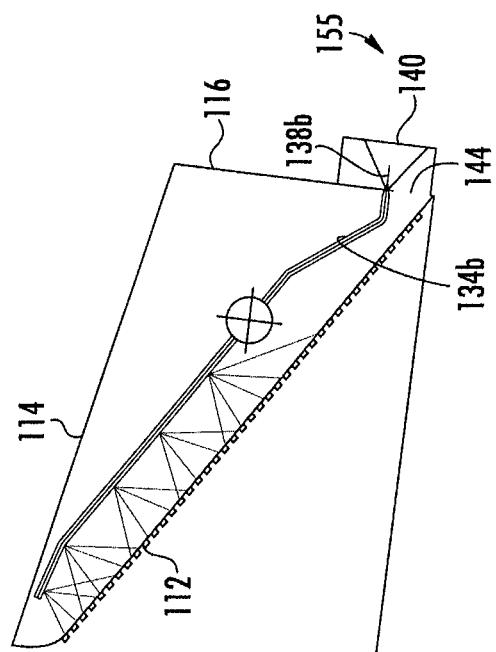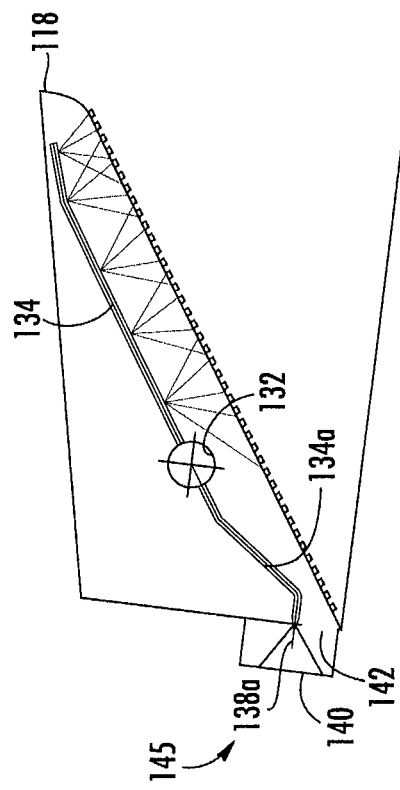
FIG. 6

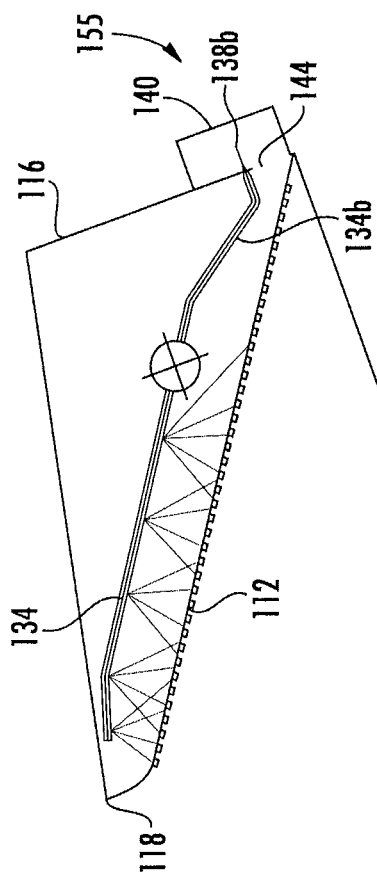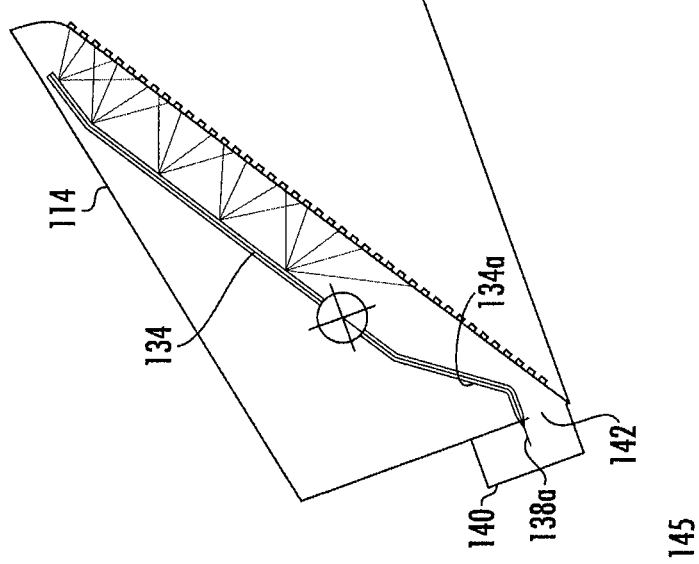
FIG. 7

COOLING SYSTEM FOR A SURFACE OF A METALLURGICAL FURNACE

BACKGROUND OF THE DISCLOSURE

Field of the Disclosure

Embodiments of the present disclosure relates generally to a cooling system for metallurgical furnaces used in the processing of molten materials. More specifically, the present disclosure relates to a cooling system of a surface (e.g., roof and/or sidewall) of a tilting metallurgical furnace.

Description of the Related Art

Metallurgical furnaces (e.g., an electric arc furnace or a ladle metallurgical furnace) are used in the processing of molten materials. The furnaces house molten materials at least during the heating step of the processing. Metallurgical furnaces process such molten materials as steel and slag.

A metallurgical furnace has a number of components, including a roof that is retractable, a hearth that is lined with refractory brick, and a sidewall that sits on top of the hearth. The metallurgical furnace typically rests on a tilting platform to enable the furnace to tilt about an axis. During the processing of molten materials, the furnace tilts in a first direction to remove slag through a first opening in the furnace referred to as the slag door. Tilting the furnace in the first direction is commonly referred to as "tilting to slag." The furnace must also tilt in a second direction during the processing of molten materials to remove liquid steel via a tap spout. Tilting the furnace in the second direction is commonly referred to as "tilting to tap." The second direction is generally in a direction substantially opposite the first direction.

Because of the extreme heat loads generated during the processing of molten materials within the metallurgical furnace, various types of cooling methods are used to regulate the temperature of, for example, the roof and sidewall of the furnace. One type of cooling method circulates a pressurized fluid-based coolant (e.g., water) through tubular pipes that form panels. The panels are then used to form the sidewall and/or roof of the furnace, such that the tubular pipes and the coolant circulated through them regulates the temperate of the metallurgical furnace during the processing of molten materials.

Accordingly, an alternative type of cooling method has been developed to reduce the likelihood of a steam explosion. The alternative type of cooling method, referred to as low pressure or non-pressurized spray-cooling, sprays a fluid-based coolant (e.g., water) against an external surface of a plate. The plate may be a part of a roof of the furnace or a part of a sidewall of the furnace. For this cooling method, the fluid-based coolant is sprayed from a nozzle at a low pressure. In some instances, the fluid-based coolant may be non-pressurized such that it is sprayed from the nozzle at atmospheric pressure. As the fluid-based coolant contacts the external surface of the plate, the coolant dissipates the heat generated within the plate as a result of the processing of molten materials, thus regulating the temperature of the plate. An evacuation system is used to continually remove spent coolant (i.e., coolant that has contacted the external surface of the plate) from the plate. Depending upon whether the plate being cooled is a part of the roof or the sidewall of the furnace, the evacuation system may be either vacuum-drained or gravity-drained.

The evacuation system includes a drain manifold for removing the spent coolant from the hot plate and subsequently moving the coolant away from the furnace. As a result of the extreme heat loads associated with the processing of molten materials, the drain manifold is also exposed to high temperatures. Typically, the temperature of the drain manifold is adequately regulated by spent coolant that is being removed from the furnace. As the spent coolant flows within the drain manifold, the spent coolant effectively cools the drain manifold. But in some instances, such as when the furnace is "tilting to slag" or "tilting to tap," the spent coolant will be diverted away from a section of the drain manifold as a result of gravity. This section of the drain manifold will therefore be exposed to extreme heat loads for a period of time substantially without cooling. The high temperature exposure thermally stresses this section of the drain manifold, increasing the risk of fatigue which may result in distortion of the drain manifold and ultimately failure.

Therefore, there is a need for an improved cooling system that helps regulate the temperature of the drain manifold.

SUMMARY

A first embodiment of the present disclosure relates to a cooling system to cool a surface of a metallurgical furnace used in the processing of molten materials. The cooling system includes an inner plate spacing an internal wall from an external wall of the surface of furnace to be cooled, a plurality of nozzles, and a drain manifold. The inner plate has an external surface and an internal surface. The plurality of nozzles is configured to be fluidly connected to a coolant supply pipe. At least a first nozzle of the plurality of nozzles has an orientation configured to direct a spray of coolant against the external surface of the inner plate. At least a second nozzle of the plurality of nozzles has an orientation configured to direct a spray of coolant directly into the drain manifold.

Another embodiment of the present disclosure relates to a roof of a metallurgical furnace. The roof of the metallurgical furnace includes an inner plate spacing an internal wall from an external wall of the roof to be cooled, a plurality of nozzles, and a drain manifold. The internal wall defines a central opening. The inner plate has an external surface and an internal surface. The inner plate is shaped such that the external surface slopes downwardly in a direction away from the internal wall towards the external wall. The plurality of nozzles is configured to be fluidly connected to a coolant supply pipe. At least a first nozzle of the plurality of nozzles has an orientation configured to direct a spray of coolant against the external surface of the inner plate. The drain manifold is positioned to receive coolant from the external surface of the inner plate. The drain manifold has at least one opening configured to enable coolant sprayed against the external surface of the inner plate to pass therethrough. At least a second nozzle of the plurality of nozzles has an orientation configured to direct a spray of coolant directly into the drain manifold.

Yet another embodiment of the present disclosure relates to method of cooling a metallurgical furnace sidewall. The method comprises supplying coolant from a supply pipe to a plurality of nozzles, spraying coolant from at least a first nozzle of the plurality of nozzles against an external surface of an inner plate, draining coolant from the external surface of the inner plate into a drain manifold, and spraying coolant received from at least a second nozzle of the plurality of nozzles directly into the drain manifold.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 6 is a cross-sectional view of the roof shown in FIG. 3, the roof being tilted towards a slag door.

FIG. 7 is a cross-sectional view of the roof shown in FIG. 3, the roof being tilted towards a tap spout.

DETAILED DESCRIPTION

The present disclosure generally relates to a spray cooling system for cooling a surface (e.g., roof and/or sidewall) of a tilting metallurgical furnace. The spray cooling system may include a distribution system and an evacuation system. The distribution system may include a supply pipe to supply coolant, and a plurality of nozzles. The supply pipe may supply a fluid-based coolant (e.g., water) to the nozzles. At least a first nozzle of the plurality of nozzles may be configured to spray the coolant against an external surface of a plate proximal to the roof or side wall of the furnace. The drain manifold may be positioned relative to the plate to enable spent coolant to be removed from the plate into the drain manifold. The drain manifold may be configured to direct spent coolant away from the metallurgical furnace. At least a second spray nozzle of the nozzles may be configured to spray coolant directly into the drain manifold. Since the second spray nozzle sprays coolant directly into the drain manifold, the drain manifold remains cooled no matter the inclination of the furnace, thereby ensuring that the drain manifold is not overheated even during tilting to slag and tilting to tap operations.

In one embodiment, discussed in more detail below, the spray cooling system of the present disclosure may be used for cooling a roof of the metallurgical furnace. In another embodiment, discussed in more detail below, the spray cooling system of the present disclosure may be used for cooling a sidewall of the metallurgical furnace. Each embodiment is discussed in greater detail below.

Figure 1:
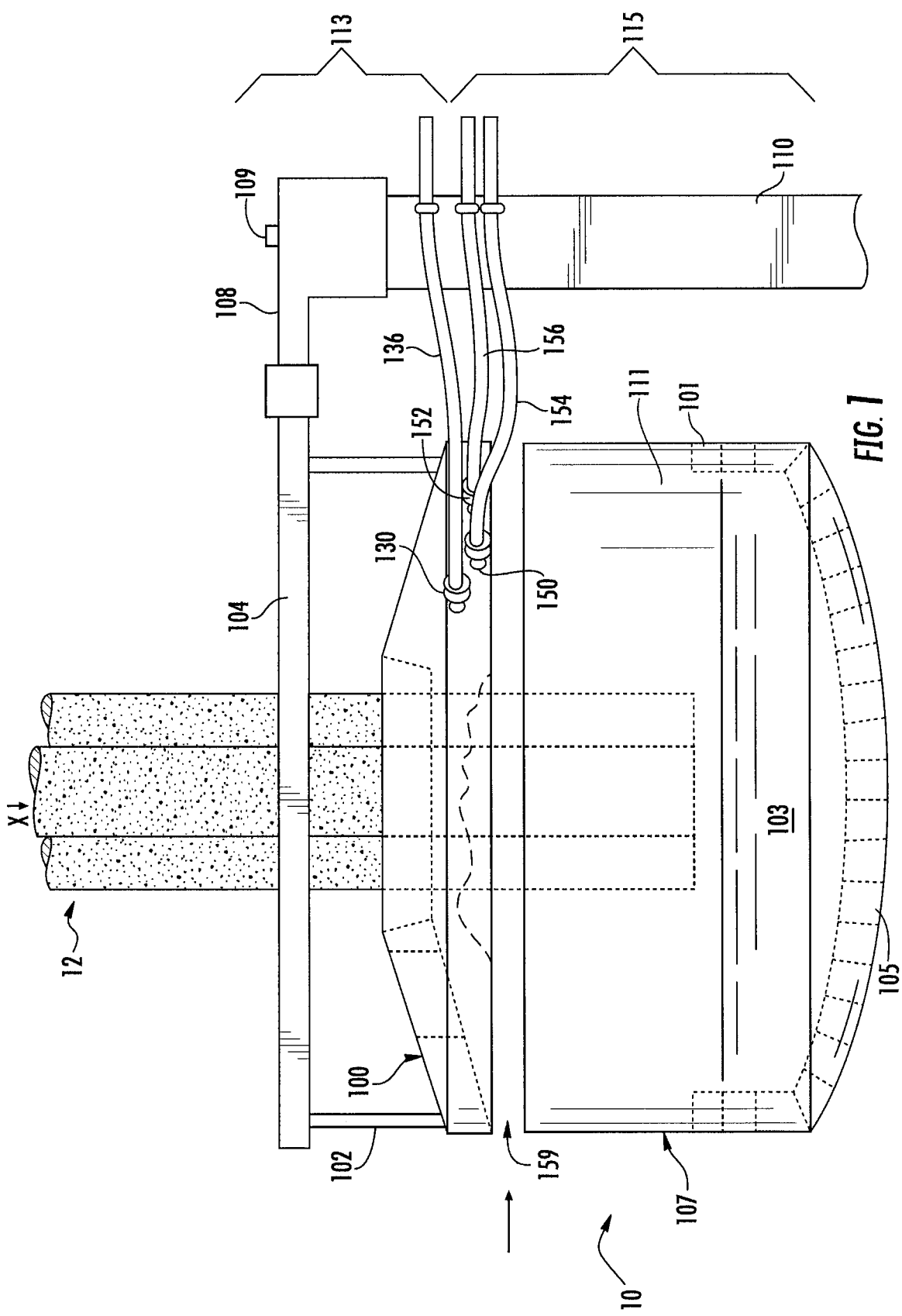
FIG. 1 is an elevational side view of a metallurgical furnace having various components, including a roof and a sidewall.
Figure 2:
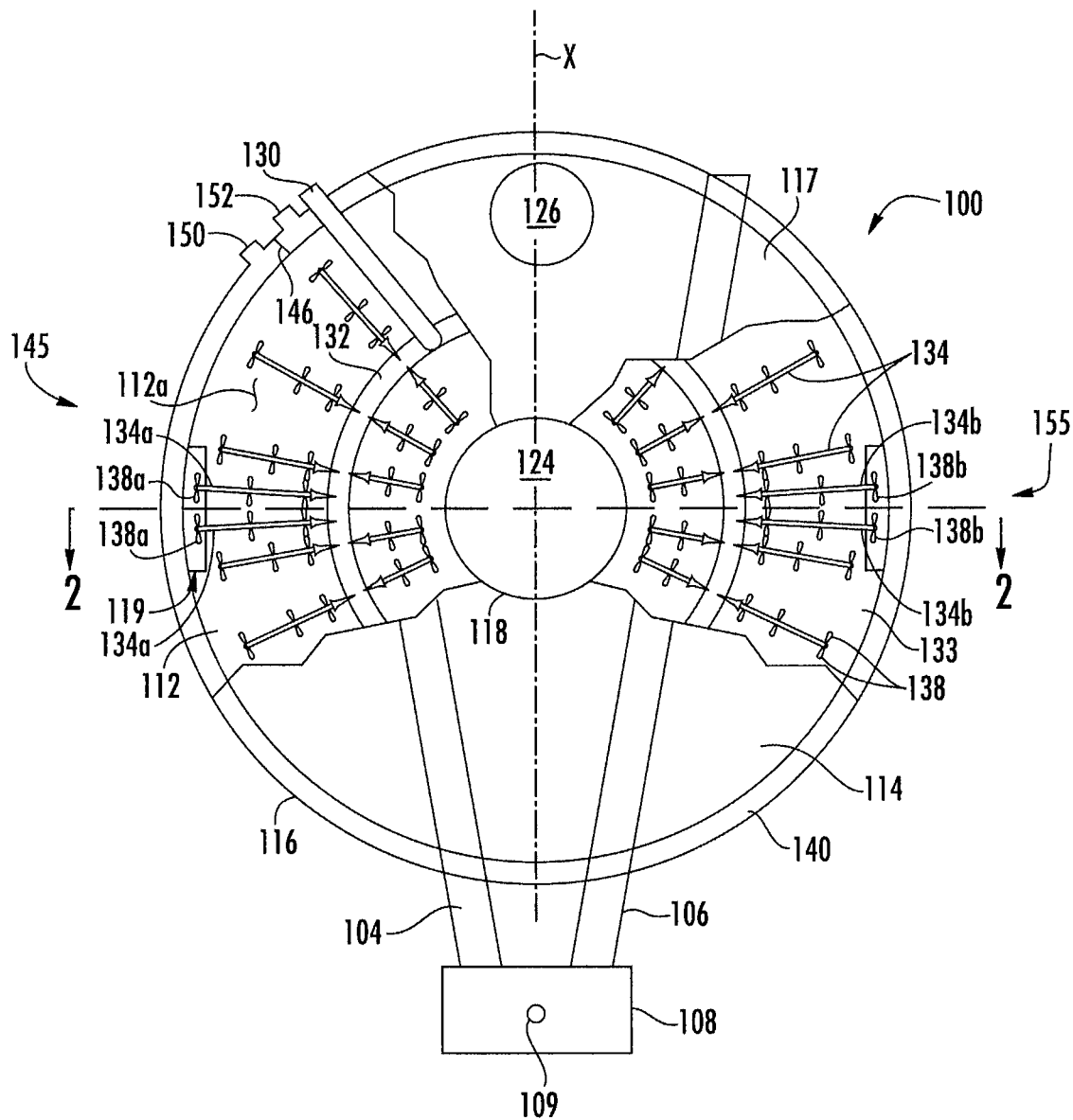
FIG. 2 is a top view of the roof shown in FIG. 1, with a portion of an outer plate of the roof broken away.
Figure 3:
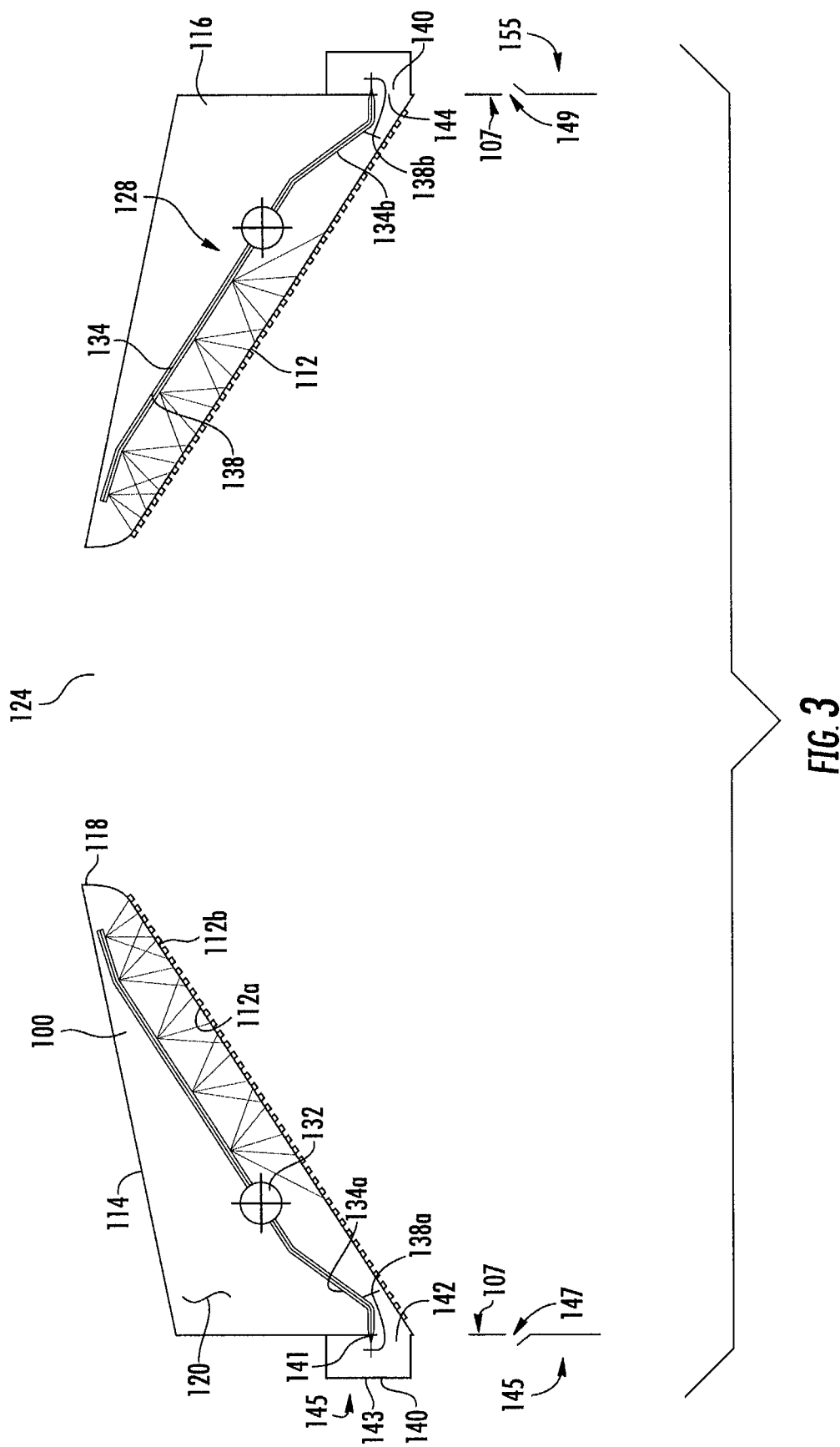
FIG. 3 is a cross-sectional view of the roof shown in FIG. 2 taken along section line 2-2 of FIG. 2.
Figure 4:
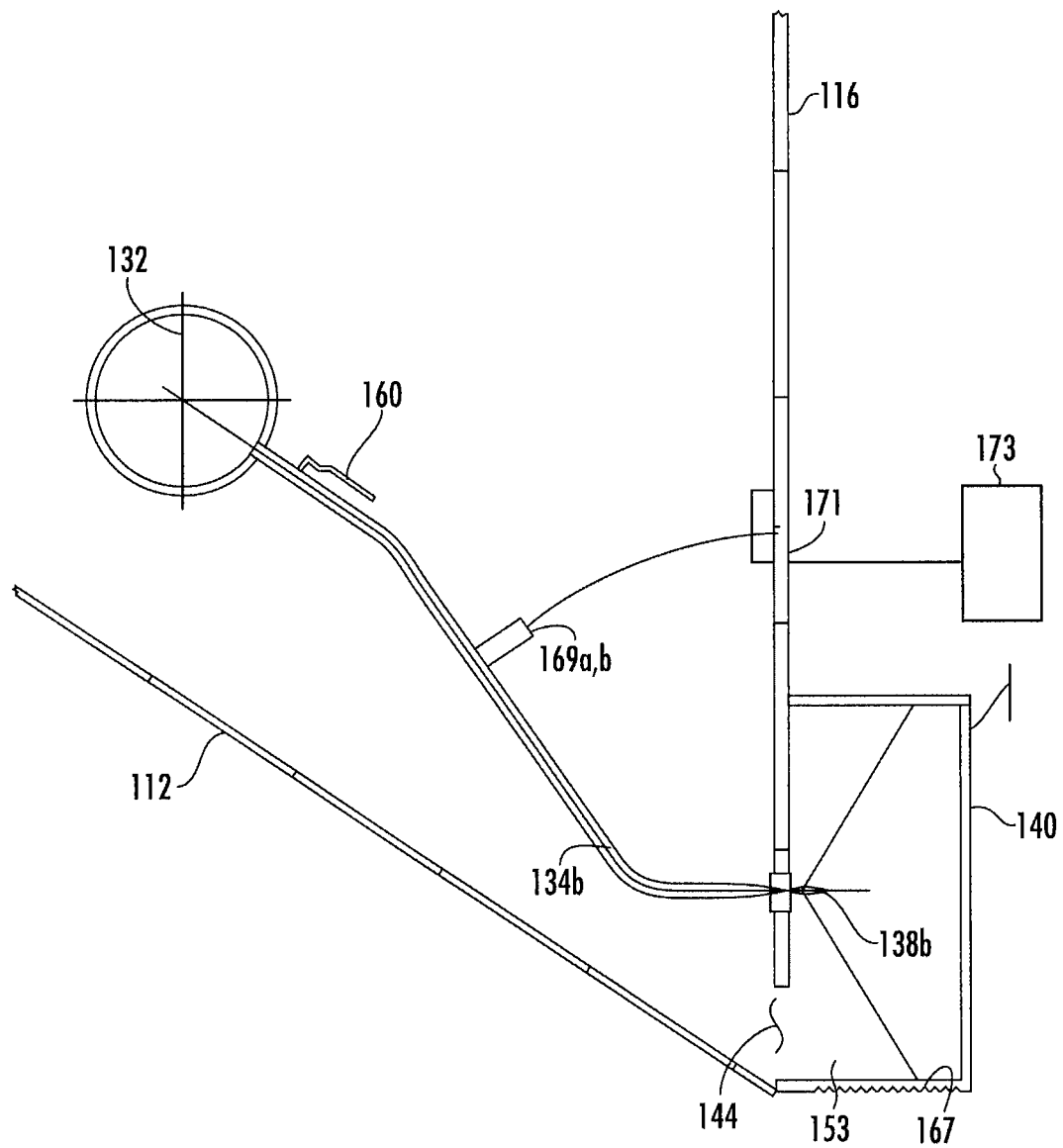
FIG. 4 is a magnified view of a portion of the cross-sectional view shown in FIG. 3.

According to one embodiment of the present disclosure, the spray-cooling system may be used for cooling a roof 100. FIG. 1 is an elevational side view of a metallurgical furnace 10 having various components, including a roof 100 that is retractable, a hearth 101 that is lined with refractory brick 105, and a sidewall 107 that sits on top of the hearth 101. FIG. 2 is a top view of the roof 100 shown in FIG. 1, with a portion 133 of an outer plate 114 of the roof 100 broken away. FIG. 3 is a cross-sectional view of the roof 100 shown in FIG. 2 taken along section line 2-2 of FIG. 2. FIG. 4 is a magnified view of a portion of the cross-sectional view shown in FIG. 3.

As shown in FIGS. 1-4, the roof 100 may be attached by chains, cables, or other roof lift members 102 to mast arms 104 and 106 that extend horizontally and spread outward from a mast support 108. The roof 100 may be lifted from the sidewall 107 to expose the interior portion 111 of the furnace 10 through a top 159 of the sidewall 107. The mast support 108 may be able to pivot around a point 109 on the upper portion of a vertical mast post 110 to swing the roof 100 horizontally to the side away from the sidewall 107. Swinging the roof 100 horizontally enables the metallurgical furnace 10 to be loaded or charged with material 103, e.g., metal, scrap metal, or other meltable material, which is to be melted within the furnace 10. The roof 100 may be circular in shape when viewed from a top view and may include an inner plate 112, an outer plate 114, an external wall 116, and an internal wall 118. The internal wall 118 may define a central opening 124 through the roof 100. Electrodes 12 may extend through the central opening 124 from a position above the roof 100. The inner plate 112 may be spaced from the outer plate 114 by the external and internal walls 116, 118, thereby forming an enclosed space 120. The inner plate 112 is a single plate having an external surface 112a directly facing the outer plate 114 and an internal surface 112b directly facing the interior portion 111 of the furnace 10 in which the material 103 is processed.

Alternatively, the inner plate 112 may be formed of a plurality of plates connected to each other. One of ordinary skill in the art will understand that other methods for connecting multiple plates together may be used in place of welding.

Figure 5:
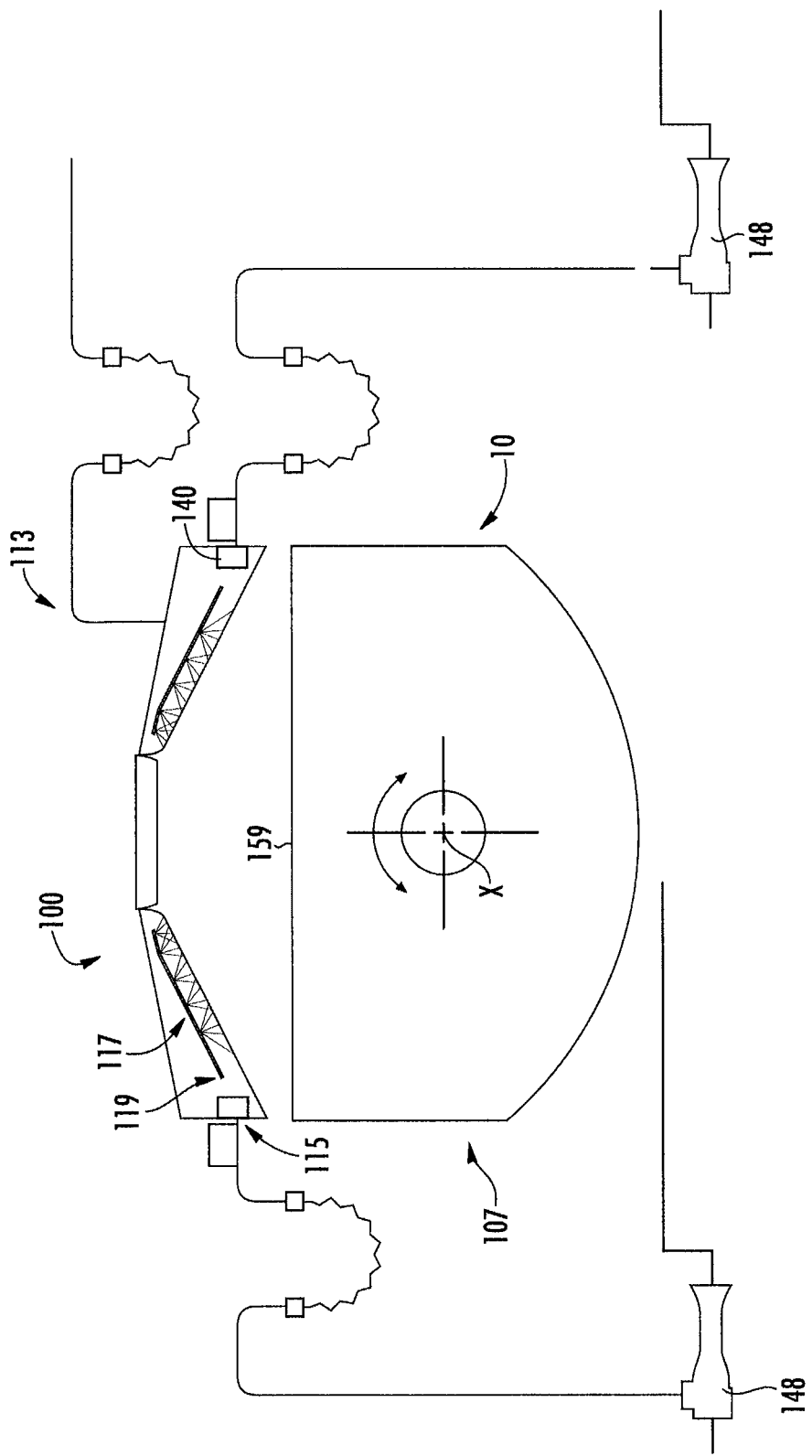
FIG. 5 is a schematic view of the metallurgical furnace shown in FIG. 1, the schematic showing an axis about which the metallurgical furnace can tilt.

During operation of the furnace 10, the electrodes 12 are lowered through the central opening 124 into an interior of the metallurgical furnace 10 to provide electric arc-generated heat to melt the material 103. The roof 100 may further include an exhaust port 126 to permit removal of fumes generated within the interior of the furnace 10 during operation. The exhaust port 126 may extend through the outer plate 114 and the inner plate 112 to form a channel to the interior portion 111 of the metallurgical furnace 10. FIG. 5 is a schematic view of the metallurgical furnace 10 shown in FIG. 1, the schematic showing an axis X about which the metallurgical furnace 10 can tilt. As shown in FIGS. 1-7, the furnace 10 may be tilted about its X axis toward the slag door 149 multiple times during a single batch melting process, sometimes referred to as a "heat", to remove slag, which can be seen in FIG. 6 Similarly, the furnace 10 may be tilted about its X axis towards a tap spout 147 multiple times during a single batch melting process to remove the molten material 103, which can be seen in FIG. 7, Referring now primarily to FIG. 3, the internal surface 112b of the inner plate 112 is exposed to the interior portion 111 of the furnace 10. To prevent excessive heat buildup in the inner plate 112, the roof 100 may further include a spray cooling system 128. The spray cooling system 128 may utilize a fluid based coolant, such as water or some other suitable liquid. The spray cooling system 128 may include a distribution system 113 and an evacuation system 115.

The distribution system 113 may include a plate cooling portion 117 and a drain cooling portion 119 that can be separately or commonly fed coolant. The plate cooling portion 117 of the distribution system 113 may include a supply pipe 130, a header 132, and a plurality of spray conduits 134. Each spray conduit 134 may include one or more nozzles 138 configured to disperse coolant in a spray or fine droplet pattern. At least a majority of the one or more nozzles 138 (e.g., first nozzles 138) may be angled to spray coolant against the external surface 112a of the inner plate 112. The supply pipe 130 may be fluidly connected to a flexible supply hose 136 that supplies fluid based coolant to the spray cooling system 128. The header 132 may be fluidly connected to the supply pipe 130 and each of the spray conduits 134 may be fluidly connected to the header 132. It is to be understood that the spray cooling system 128 could include more than one supply pipe and more than one header.

The header 132 may be located within the enclosed space 120 defined by the inner plate 112, the outer plate 114, the external wall 116, and the internal wall 118 of the roof 100. The header 132 may form a circular shape having a diameter that is greater than a diameter of the internal wall 118 of the roof 100 but less than a diameter of the external wall 116 of the roof 100. The spray conduits 134 may branch radially from the header 132 in a spoke-like pattern. At least some of the spray conduits 134 may branch radially outwards from the header 132 towards the external wall 116 and at least some of the spray conduits 134 may branch radially inwards from the header 132 towards the internal wall 118. As discussed above, each spray conduit 134 may include one or more nozzles 138 configured to disperse coolant in a spray or fine droplet pattern. As shown in FIGS. 2 and 3, the majority of the nozzles 138 may be angled to direct the spray of coolant against the external surface 112a of the inner plate 112. The spray conduits 134 may be arranged in a manner such that coolant is sprayed across substantially the entirety of the external surface 112a of the inner plate 112.

In an embodiment of the present disclosure, the drain cooling portion 119 of the evacuation system 115 may include the nozzles 138 (e.g., second nozzles 138a, 138b) of some of the spray conduits 134 angled to direct the coolant towards a drain manifold 140.

As best seen in FIG. 3, the inner plate 112 may be shaped to slope downwardly from the central opening 124 to facilitate the removal of spent coolant from the inner plate 112 into the drain manifold 140 of the drain cooling portion 119 of the evacuation system 115. In one embodiment, the inner plate 112 may be frusto-conical in shape. After being sprayed onto the inner plate 112, the coolant may drain outwardly along the external surface 112a of the inner plate 112 and flows into the drain manifold 140 via opening 142 and opening 144. The openings 142, 144 are generally located 180 degrees from each other, and 90 degrees offset from the axis X. It is to be understood that the drain manifold may include less than or more than the two openings 142, 144, and that the drain manifold 140 may include other opening disposed between the openings 142, 144.

As best seen in FIGS. 3 and 4, the openings 142, 144 for receiving the coolant running off the inner plate 112 into the drain manifold 140 may be located within an internal wall 141 of the drain manifold 140. It is to be understood that the internal wall 141 of the drain manifold 140 may be formed integrally with the external wall 116 of the roof 100 such that the internal wall of the drain manifold 140 is a downward extension of the external wall 143 of the roof 100. As can be seen in FIG. 3, opening 142 may be located on tap side 145 of the roof 100 and opening 144 may be located on the slag side 155 of the roof 100, i.e., the openings 142, 144 are disposed 180 degrees apart. For example, an opening 142 may be located on a tap side 145 of roof 100 (i.e., the side of the roof 100 corresponding to the tap spout 147 of the furnace 10) and an opening 144 may be located on a slag side 155 of the roof 100 (i.e., the side of the roof 100 corresponding to a slag door 149 of the sidewall 107). In some instances, the opening 142 may be located directly above the tap spout 147 and opening 144 may be located directly above the slag door 149.

The drain manifold 140 may be a substantially closed channel made of, for example, rectangular cross section tubing. The drain manifold 140 may extend around the entire periphery of the roof 100 and be circumferentially separated by a partition 146. It is to be understood that the drain manifold 140 may include additional partitions. As shown in FIGS. 2-7, the drain manifold 140 may be located outside of the enclosed space 120 defined by the inner plate 112, the outer plate 114, the external wall 116, and the internal wall 118.

The evacuation system 115 of the spray cooling system 128 may further include outlet pipes 150 and 152 and outlet hoses 154 and 156. Outlet pipe 150 may be fluidly connected to outlet hose 154 and outlet pipe 152 may be fluidly connected to outlet hose 156. Outlet pipe 150 may be located on the tap side 145 of a partition 146 and outlet pipe 152 may be located on the slag side 155 of a partition 146. Quick release fasteners or other couplings may be used to connect the outlet hoses 154, 156 to the outlet pipes 150, 152.

As shown schematically in FIG. 5, the evacuation system 115 may further include pumps 148, such as venturi pumps, for quickly and efficiently draining the spent coolant from the drain manifold 140 through outlet pipes 150 and 152. The pumps 148 may create a slight vacuum within the drain manifold 140 because it is a substantially closed channel, which promotes the efficiency of coolant removal.

During operation of the furnace 10, coolant may flow through the flexible supply hose 136 into supply pipe 130. Coolant may then flow into the header 132 and be distributed around the enclosed space 120 of the roof 100 by spray conduits 134. The nozzles 138 of the spray conduits 134 may spray the coolant across the external surface 112a of the inner plate 112. After coolant is sprayed from nozzles 138 against the external surface 112a of the inner plate 112, the coolant running off the external surface 112a may be collected and received into the drain manifold 140 through openings 142, 144 because of the downward slope of the inner plate 112. The collected coolant may then be removed from the drain manifold 140 under a vacuum from via outlet pipes 150 and 152. Upon being drained from the roof 100, coolant may either be discarded or may be re-circulated (with optional cooling) back into the roof 100.

As previously noted, the metallurgical furnace 10 rests on a tilting platform to enable the furnace 10 to tilt about the axis X during the processing of the material 103. When the furnace 10 tilts toward the slag door 149, which can be seen in FIG. 6, the spray cooling system 128 within the roof 100 continues to operate. Accordingly, the nozzles 138 of the spray conduits 134 continue to spray coolant against the external surface 112a of the inner plate 112. However, in conventional system, because a furnace may be tilted about its axis towards the slag side 155, little to no coolant dispensed from the first nozzles may enter into a drain manifold 140. Rather, gravity may force most of the spent coolant to flow across an external surface of an inner plate on one side of the drain manifold. Thus, while the furnace is tilted about its axis X, a section of the drain manifold may have little to no coolant dispensed from the first nozzles within it. Without coolant to help regulate the temperature of the drain manifold, the drain manifold may be exposed to extreme heat loads coming from the furnace without an effective cooling method. One source of the extreme heat loads comes from the internal heat of the furnace that may escape at an interface between the roof and the sidewall 107. One particular area of concern within the drain manifold 140 may be at the location directly above a tap spout 147 because additional heat from the interior of the furnace may escape from around the tap spout. High temperature exposure without an effective cooling method thermally may stress the drain manifold, increasing the risk of fatigue and failure.

Similarly, when the furnace 10 is titled about its axis X towards the tap spout 147, which can be seen in FIG. 7, little to no spent coolant provided by the first nozzles 138 that spray coolant directly on the external surface 112a of the inner plate 112 may enter the drain manifold 140. Thus, while the furnace is tilted about its axis X towards the tap spout, a section of the drain manifold will have little to no coolant dispensed from the first nozzles within it. Consequently in conventional furnaces, the drain manifold may be exposed to extreme heat loads coming from the furnace for a period of time without an effective cooling method. One particular area of concern within the drain manifold may be at the location directly above the slag door because additional heat from the interior of the furnace may escape from around the slag door. High temperature exposure without an effective cooling method may thermally stress the drain manifold, increasing the risk of fatigue and failure.

To alleviate this issue, in an embodiment of the furnace 10, the nozzles 138 identified as 138a may be positioned to spray coolant directly into the drain manifold 140 proximal to the opening 142 located on the tap side 145 of the roof 100 about the axis X and the nozzles 138 identified as 138b may be positioned to spray coolant directly into the drain manifold 140 proximal to the opening 144 may be located on the slag side 155 of the roof 100 about the axis X during operation of the roof 100. More particularly, the nozzles 138 may be positioned to spray coolant against the external wall 161 of the drain manifold 140 and the nozzles 138 of spray conduits 134b may be positioned to spray coolant against the external wall 161 of the drain manifold 140. This can be best seen in the magnified view shown in FIG. 4. The spray conduits 134a and 134b may be directly connected to the header 132 similar to all of the other spray conduits 134. Alternatively, spray conduits 134a and 134b may be fluidly connected to the header 132 by extending from one of the other spray conduits 134. Alternatively, the nozzles 138a, 138b may be source separately from the header 132 or other spray conduits 134.

As can be seen in FIGS. 3 and 4, the nozzles 138a may be located in or adjacent a small opening 163 in the internal wall 165 of the drain manifold 140. The opening 163 may be sized to enable the nozzles 138 to be located within the opening 163. The opening 163 may be located directly above the opening 142. Similarly, the nozzles 138b may be located in or adjacent a small opening 163 in the internal wall 165 of the drain manifold 140 sized to enable the nozzles 138b to be located within the drain manifold 140. The opening 163 may be located directly above the opening 144. It is to be understood, however, that in an alternative embodiment, the nozzles 138a, 138b may pass directly through the openings 142, 144 rather than being positioned in or adjacent small openings in the internal wall 165 of the drain manifold 140. Although FIGS. 2-7 show only the nozzles 138a, 138b spraying coolant directly into the drain manifold 140, one of ordinary skill in the art will understand that the nozzles 138a, 138b of additional spray conduits 134 may be positioned to spray coolant directly into the drain manifold 140. Alternatively, one of ordinary skill in the art will understand that the nozzle 138a, 138b of only a single spray conduit 134 may be positioned to spray coolant directly into the drain manifold 140. One of ordinary skill in the art will further understand that the nozzles 138a, 138b of any additional spray conduits 134 may be positioned to spray coolant directly into the drain manifold 140 via either openings 142, 144, or via an alternative opening within the internal wall 165 of the drain manifold 140.

Positioning the nozzles 138a to spray coolant directly into the drain manifold 140 via opening 142 ensures that coolant may be present within all sections of the drain manifold 140 even when the furnace 10 is tilted about its axis X towards the slag side 155. Similarly, positioning the nozzles 138b to spray coolant directly into the drain manifold 140 via opening 144 ensures that coolant will be present within all sections of the drain manifold 140 even when the furnace 10 is tilted about its axis X towards the tap spout 147. Accordingly, the present disclosure provides an effective cooling method for cooling the section of the drain manifold 140 of the roof 100 that would otherwise be exposed to extreme heat loads without little to no coolant within it when the furnace 10 is titled about its axis X towards either the slag door 149 or the tap spout 147.

As shown in FIG. 4, the spray conduits 134a and 134b may each include a valve 160 that enables the flow of coolant to each individual spray conduit 134 to be shut-off for maintenance or other purposes. A person of ordinary skill in the art will further understand that any of the other sprays conduits 134 may also include a shut-off valve 160. One or both of spray conduits 134a and 134b may also include a control valves 169a, 169b connected to a control system 173 proximal to the slag door 149 and the tap spout 147, respectively. The control system 173 may be connected to an inclinometer 171 of the furnace 10. The inclinometer 171 may be configured to measure an inclination of the roof 100 of the furnace 10. Depending upon the inclination of the furnace 10, the control system 173 may be configured to send a signal to each control valve 169 to place the control valves 169a, 169b into either an opened configuration or a closed configuration. Such a control system may ensure that second nozzles 138a and 138b are only spraying coolant directly into the drain manifold 140 when necessary. For example, when the furnace 10 is tilted about its axis X towards the slag door 149, the control system 173 may send a signal to the control valves 169b to place the control valves 169b in an opened configuration while at the same time sending a signal to the control valves 169a to place the control valves 169a in a closed configuration. Because the furnace 10 is tilted about its axis X towards the slag door 149, the only coolant being introduced into the drain manifold 140 through opening 142 will come from the nozzles 138a. At the same time, it is not necessary for nozzles 138b to spray coolant directly into the drain manifold 140 because all or most of the spent coolant being removed from the inner plate 112 will be passing through opening 144. Alternatively, when the furnace 10 is titled about its axis X towards the tap spout 147, the control system 173 may send a signal to the control valves 169a to place the control valves 169a in a closed configuration while at the same time sending a signal to the control valves 169b to place the control valves 169b in an opened configuration. When the furnace 10 is level, it may not be necessary to introduce coolant directly into the drain manifold 140. In such a situation, the control system 173 may send the same signal to the control valves 169a and the control valves 169b to place the control valves 169a, 169b in a closed configuration.

Figure 8:
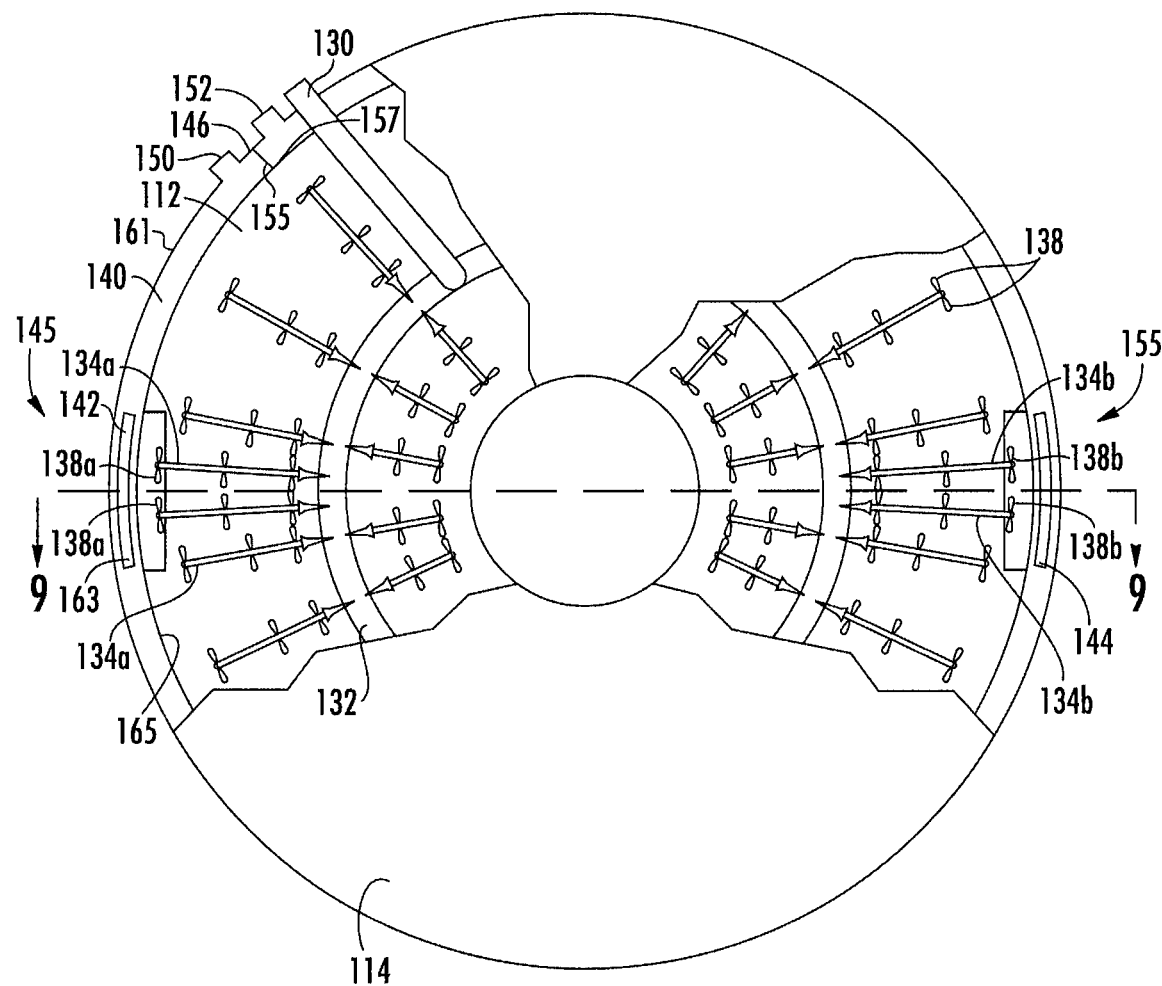
FIG. 8 is a top cutaway view of another embodiment of the roof having an internal drain manifold, a portion of an outer plate of the roof being shown cutaway.
Figure 9:
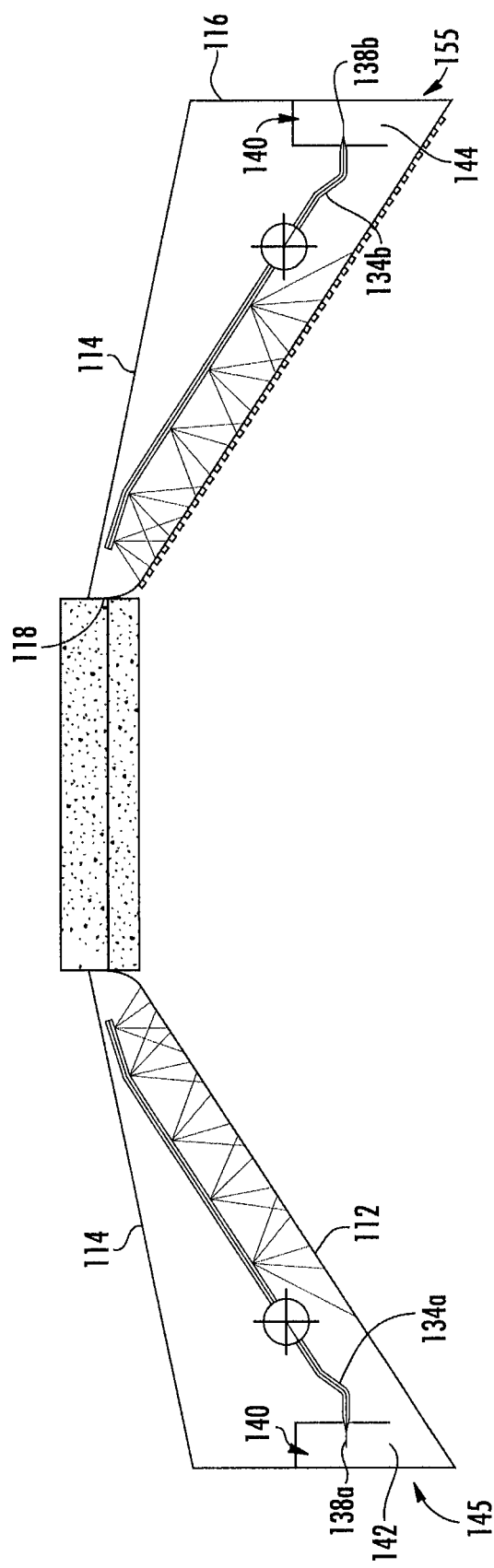
FIG. 9 is a cross-sectional view of the roof shown in FIG. 8 taken along line 9-9.
Figure 10:
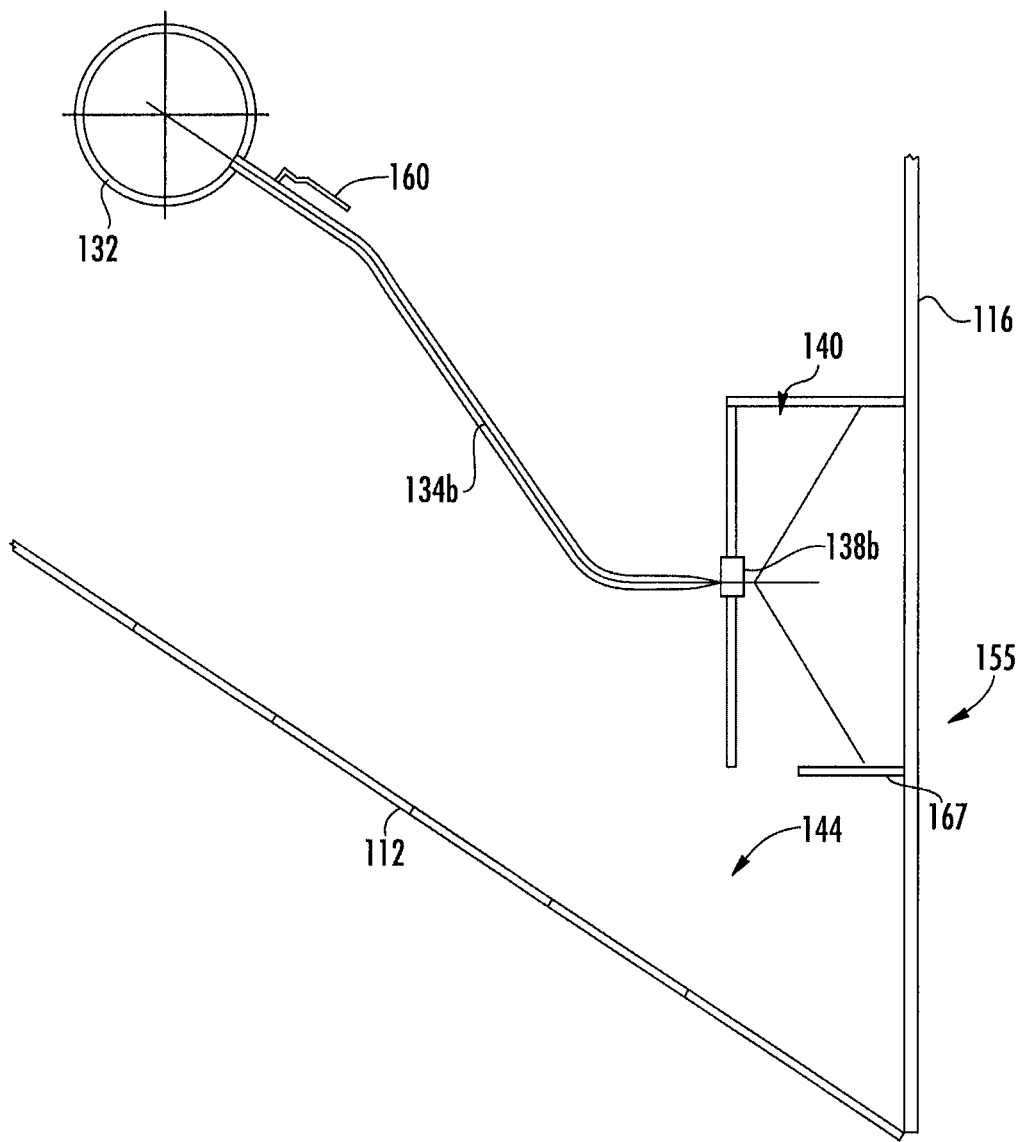
FIG. 10 is an enlarged view of a portion of the cross-sectional view shown in FIG. 9.

FIGS. 8-10 are views of another embodiment of the roof having an internal drain manifold, a portion of an outer plate of the roof being shown cutaway. Referring to FIGS. 8-10, the drain manifold 140 may be located within the enclosed space 120. When located within the enclosed space 120, the opening 142 may be located within a bottom wall 167 of the drain manifold 140. Similarly, the opening 144 may be located within the bottom wall 167 of the drain manifold 140. When the drain manifold 140 is located within the enclosed space 120, the external wall 161 of the drain manifold 140 may be integral with the external wall 116 of the roof 100. Alternatively, a portion of the inner plate 112 may defined the bottom wall 167 of the drain manifold 140.

In an embodiment of the present disclosure, the nozzles 138 identified as 138a may be positioned to spray coolant directly into the drain manifold 140 proximal to the opening 142 located on the tap side 145 of the roof 100 about the axis X and the nozzles 138 identified as 138b may be positioned to spray coolant directly into the drain manifold 140 proximal to the opening 144 may be located on the slag side 155 of the roof 100 about the axis X during operation of the roof 100. More particularly, the nozzles 138 may be positioned to spray coolant against the external wall 161 of the drain manifold 140 and the nozzles 138 of spray conduits 134b may be positioned to spray coolant against the external wall 161 of the drain manifold 140.

Figure 11:
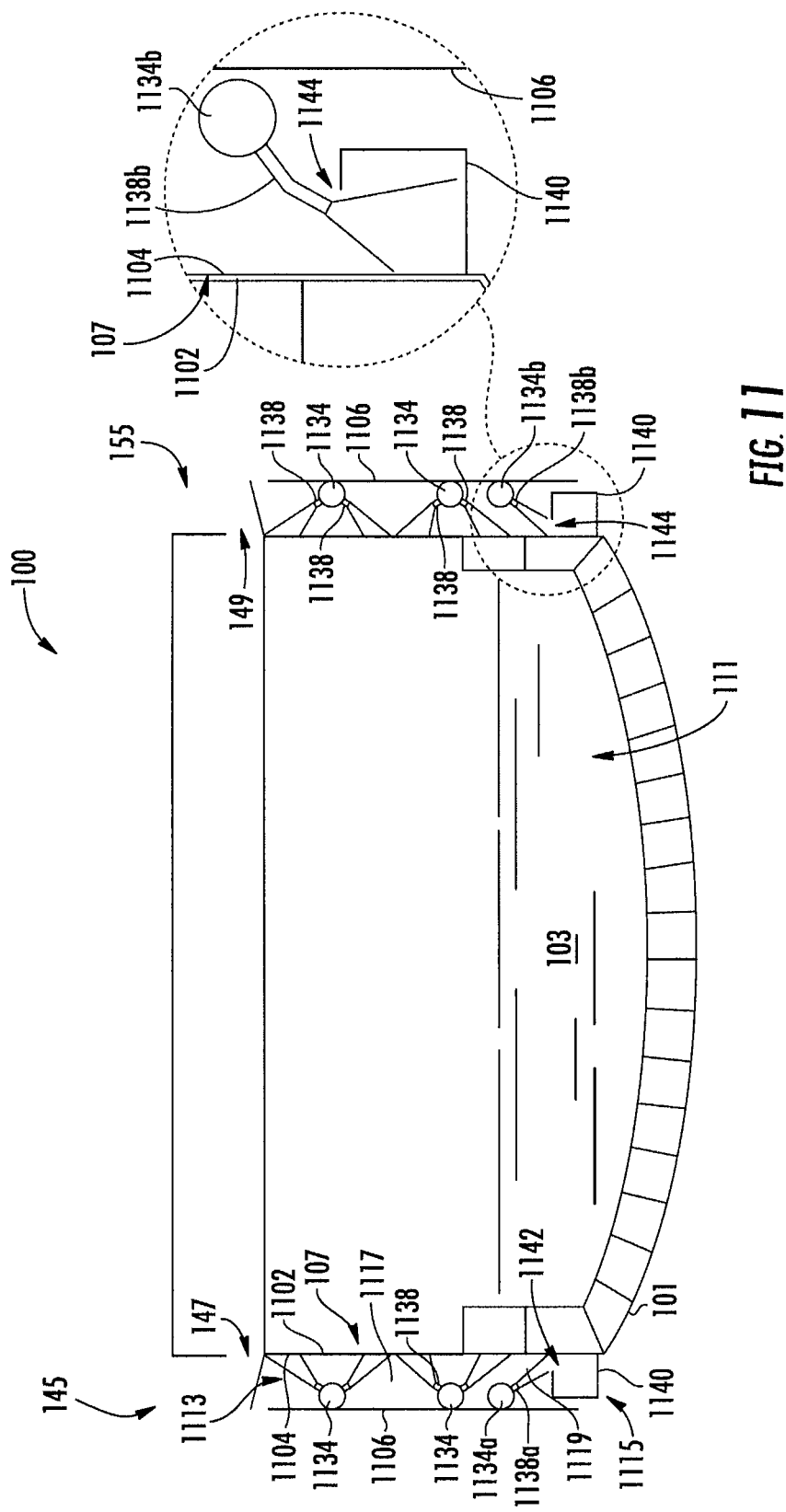
FIG. 11 is an elevational side view of a sidewall of a metallurgical furnace.

FIG. 11 is an elevational side view of the sidewall 107 of the metallurgical furnace 10 with the roof 100 not shown. The sidewall 107 includes an interior side 1102 and an exterior side 1104. The interior side 1102 faces the interior portion 111 of the furnace 10 in which the material 103 is processed. The exterior side 1104 faces an outer plate 1106 that is spaced apart from the sidewall 107.

A distribution system 1113 and an evacuation system 1115 are disposed in a space 1110 defined between the outer plate 1106 and the sidewall 107. The distribution system 1113 includes a plate cooling portion 1117, and a drain cooling portion 1119. The plate cooling portion 1117 includes a plurality of nozzles 1138 which are oriented to disperse coolant in a spray or fine droplet pattern. At least a majority of the nozzles 1138 (e.g., first nozzles 1138) may be oriented to spray coolant against the exterior side 1104 of the sidewall 107. Spray conduits 1134 fluidly connects the nozzles 1138 via supply pipes 130 to the spray cooling system 128 (not shown in FIG. 11) in a manner similar to described above with reference to the distribution system 113 or other suitable manner.

The drain cooling portion 1119 of the distribution system 1113 includes a smaller number of the nozzles 1138 (e.g., second nozzles 1138). The second nozzles 1138 are utilized to control the temperature of the evacuation system 1115 as further discussed below.

The evacuation system 1115 is utilized to remove spent coolant from the sidewall 107 of the furnace 10. The evacuation system 1115 includes a drain manifold 1140 that may be coupled to the pumps 148 as described above with reference to the evacuation system 115, or to gravity drains.

The drain manifold 1140 may be attached to or abut against the exterior side 1104 of the sidewall 107. The drain manifold 1140 may also attach to the outer plate 1106. The drain manifold 1140 generally circumscribes the sidewall 107 and includes a hollow interior configured to collect and remove spent coolant as described above with reference to the evacuation system 115. The drain manifold 1140 may be an open channel or a substantially closed channel made of, for example, rectangular cross section tubing. The drain manifold 1140 may be or may not be circumferentially separated by a partition, as described above. It is to be understood that the drain manifold 1140 may include additional partitions. In the example depicted in FIG. 11, the drain manifold 1140 is a square tube, although other profile tube cross-sections may be utilized.

A top surface of the drain manifold 1140 facing towards the roof includes a plurality of openings for receiving spent coolant that has been sprayed on the sidewall 107 of the furnace. In the example depicted in FIG. 11, at least a first opening 1142 and a second opening 1144 are disposed through a top surface of the drain manifold for receiving the spent coolant. The first opening 1142 is disposed on the tap side 145 above the tap spout 147. The second opening 1144 is disposed on the slag side 155 above the slag door 149.

As discussed above, to keep the drain manifold 1140 from overheating when tipping to slag or tipping to pour, the drain cooling portion 1119 of the distribution system 1113 includes second nozzles 1138 (e.g., second nozzles 1138a, 1138b) angled to direct the coolant directly into the drain manifold 1140 though the openings 1142, 1144. For example, the nozzle 1138a is positioned to spray coolant directly into the drain manifold 1140 through the opening 1142 located on the tap side 145 of the sidewall 107 while the nozzle 1138b is positioned to spray coolant directly into the drain manifold 1140 through the opening 1144 located on the slag side 155 of the sidewall 107 independent of if the furnace 10 is tilted to slag or tilted to tap. Accordingly, the present disclosure provides an effective cooling method for cooling the section of the drain manifold 1140 of the sidewall 107 that would otherwise be exposed to extreme heat loads without little to no coolant within it when the furnace 10 is tilted. The nozzles 1138a, 1138b may also be interfaced with control valves 169 (such as shown in FIG. 4) such that the flow through the nozzles 1138a, 1138b may be turned on or off in response to the inclination of the furnace 10 as described above.

While the foregoing is directed to embodiments of the present disclosure, other and further embodiments may be devised without departing from the basic scope thereof, and the scope thereof is determined by the claims that follow.

What is claimed is:

1. A cooling system for regulating temperature of a surface of a metallurgical furnace, the cooling system comprising:
an inner plate having an external surface and an internal surface and spacing an internal wall from an external wall of the surface of the furnace to be cooled;
a plurality of nozzles fluidly connected to a coolant supply pipe to, at least a first nozzle of the plurality of nozzles having an orientation to spray coolant against the external surface of the inner plate;
a drain manifold positioned to receive sprayed coolant from the external surface of the inner plate; and
at least a second nozzle of the plurality of nozzles having an orientation configured to spray coolant directly into the drain manifold.

2. The cooling system of claim 1 further comprising:
an outer plate spaced from the inner plate, wherein the outer plate and the inner plate at least partially define a substantially enclosed space, the plurality of nozzles are located within the substantially enclosed space.

3. The cooling system of claim 2 wherein the drain manifold is located within the substantially enclosed space.

4. The cooling system of claim 2 wherein the drain manifold is located external to the substantially enclosed space.

5. The cooling system of claim 1, wherein the inner plate is part of a furnace roof.

6. The cooling system of claim 1, wherein the inner plate is part of a furnace sidewall.

7. The cooling system of claim 1, wherein configured to spray an internal wall of the drain manifold.

8. The cooling system of claim 1, wherein the first nozzle and the second nozzle are coupled to separate fluid sources.

9. A cooling system for regulating temperature of a roof of a metallurgical furnace, comprising:
an inner plate spacing an internal wall from an external wall of the roof to be cooled, the internal wall defining a central opening, the inner plate having an external surface and an internal surface, the inner plate being shaped such that the external surface slopes downwardly in a direction away from the internal wall towards the external wall;
a plurality of nozzles fluidly connected to a coolant supply pipe, at least a first nozzle of the plurality of nozzles having an orientation configured to spray coolant against the external surface of the inner plate;
a drain manifold positioned to receive coolant from the external surface of the inner plate, the drain manifold having at least one opening configured to enable coolant sprayed against the external surface of the inner plate to pass therethrough; and
a second nozzle of the plurality of nozzles having an orientation configured to spray coolant directly into the drain manifold.

10. The roof of claim 9 further comprising:
an outer plate spaced from the inner plate by the internal and external walls, wherein the outer plate, the inner plate, the internal wall, and the external wall collectively define a substantially enclosed space, the plurality of nozzles being located within the substantially enclosed space.

11. The roof of claim 10 wherein the drain manifold and the second nozzle are located within the substantially enclosed space.

12. The roof of claim 10 wherein the drain manifold is located external to the substantially enclosed space.

13. The roof of claim 9 wherein the second nozzle is positioned to spray coolant predominantly into the drain manifold through the at least one opening.

14. The roof of claim 13 wherein the at least one opening is a first opening and the drain manifold further comprises:
a second opening, the first opening located on a first side of the roof and the opening located on a second side of the roof distal to the first side of the roof.

15. The roof of claim 14 further comprising:
a third nozzle having an orientation configured to spray coolant directly into the drain manifold through the second opening.

16. The roof of claim 14 wherein the drain manifold is a substantially closed conduit having a generally tubular cross section.

17. A method of cooling a metallurgical furnace, comprising:
spraying coolant from at least a first nozzle of a plurality of spray nozzles against an external surface of an inner plate of a wall of the metallurgical furnace, the inner plate having an internal surface exposed to an interior of the metallurgical furnace;
draining coolant from the external surface of the inner plate into a drain manifold; and
directing a spray of coolant from at least a second nozzle of the plurality of nozzles directly into the drain manifold.

18. The method of claim 17 further comprising:
tilting the furnace about an axis such that a first portion of the drain manifold is above a level plane and a second portion of the drain manifold is below the level plane, spraying coolant from the first nozzle into the first portion of the drain manifold only when the first portion of the drain manifold is above the level plane.

19. The method of claim 17, wherein the inner plate is part of a furnace roof.

20. The method of claim 17, wherein the inner plate is part of a furnace sidewall.

* * * * *